United States Patent [19]

Dunlap

[11] 4,410,148
[45] Oct. 18, 1983

[54] FEEDBACK CONTROL CIRCUIT FOR PHOTOSENSORS IN MAGNETIC TAPE DRIVES

[75] Inventor: Robert E. Dunlap, Littleton, Colo.

[73] Assignee: Storage Technology Corporation, Louisville, Colo.

[21] Appl. No.: 267,254

[22] Filed: May 26, 1981

[51] Int. Cl.³ .................. B65H 59/38; G03B 1/04; G11B 15/06
[52] U.S. Cl. .................................. 242/188; 360/74.6
[58] Field of Search ............... 242/182, 184, 186, 188; 250/570, 571, 574, 230, 231 R, 238; 360/71, 73, 74.6

[56] References Cited

U.S. PATENT DOCUMENTS 3,614,020 10/1971 Herger .............................. 242/188
4,344,429 8/1982 Gupton et al. ................. 250/574 X Primary Examiner—Leonard D. Christian
Attorney, Agent, or Firm—Woodcock, Washburn, Kurtz, Mackiewicz & Norris

[57] ABSTRACT

A magnetic tape recording and reproducing system in which a light reflective marker is on each reel of tape and has a feedback circuit connected between the light sensor and the source of light for controlling the intensity of the source to maintain the output substantially constant, notwithstanding changes of reflectivity of the tape or gradual changes of efficiency of the source of light. The feedback circuit provides improved detection of the passage of the reflective marker past the sensor.

11 Claims, 4 Drawing Figures

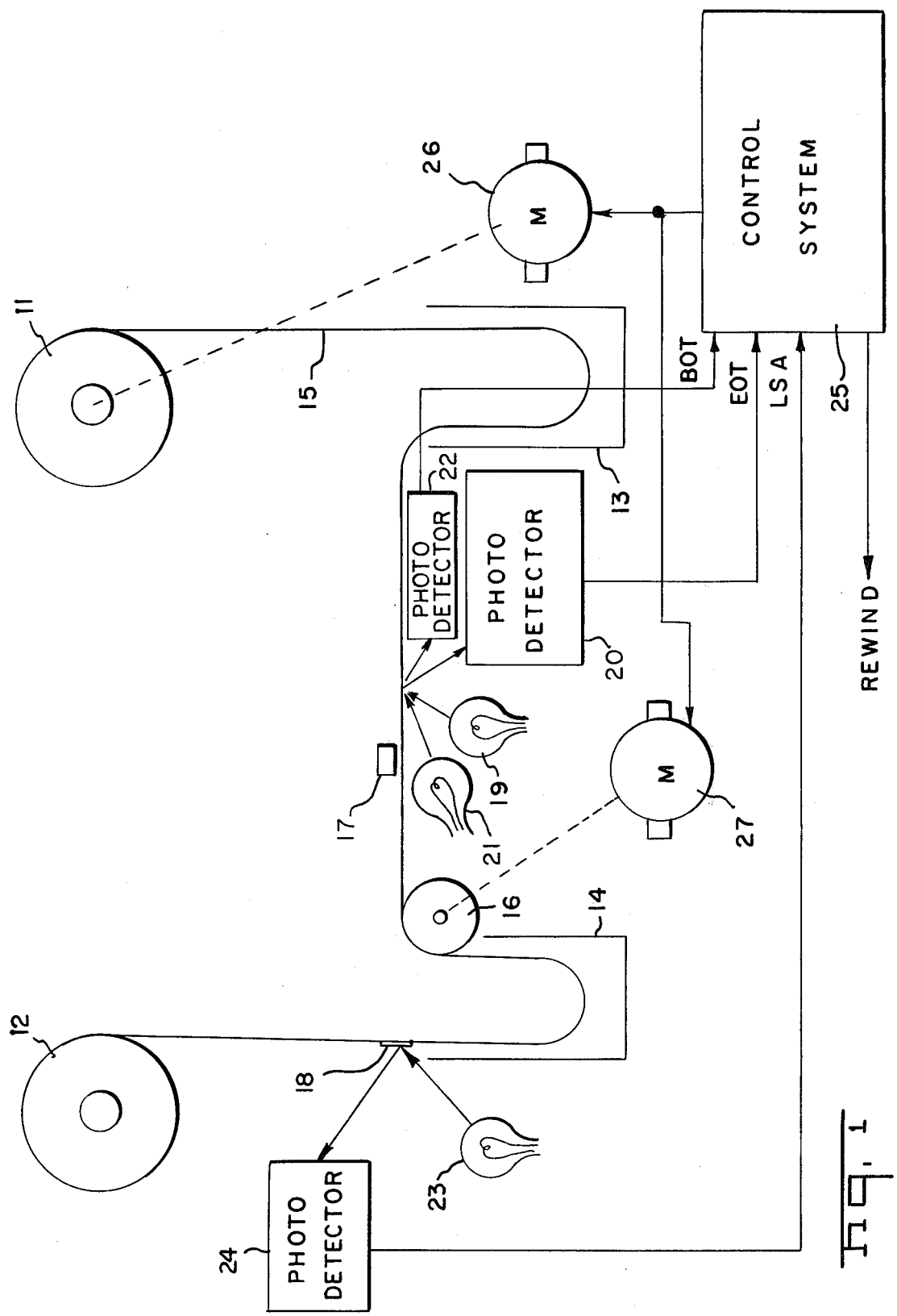

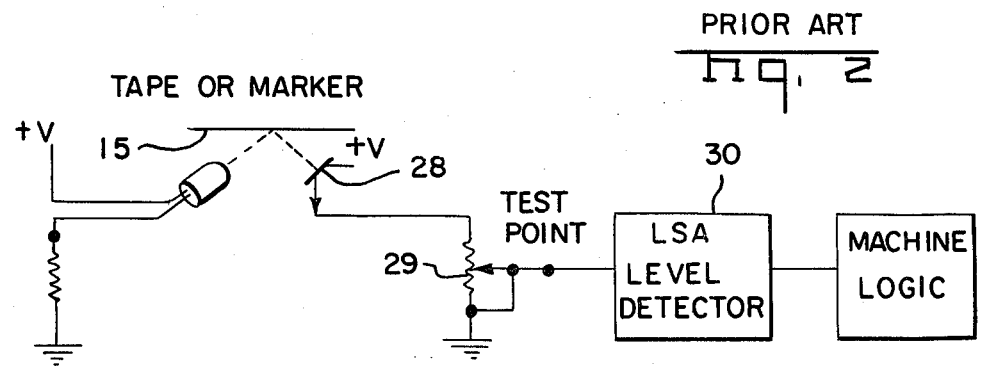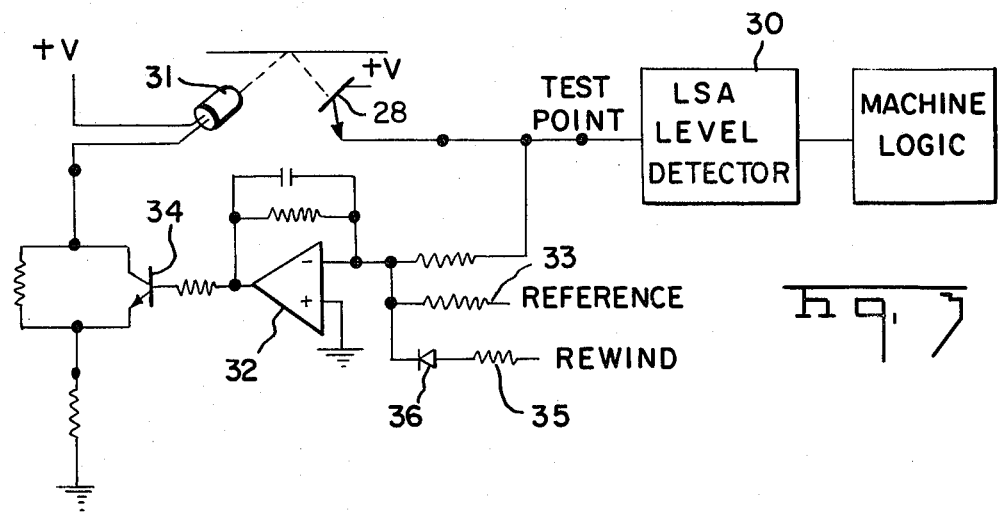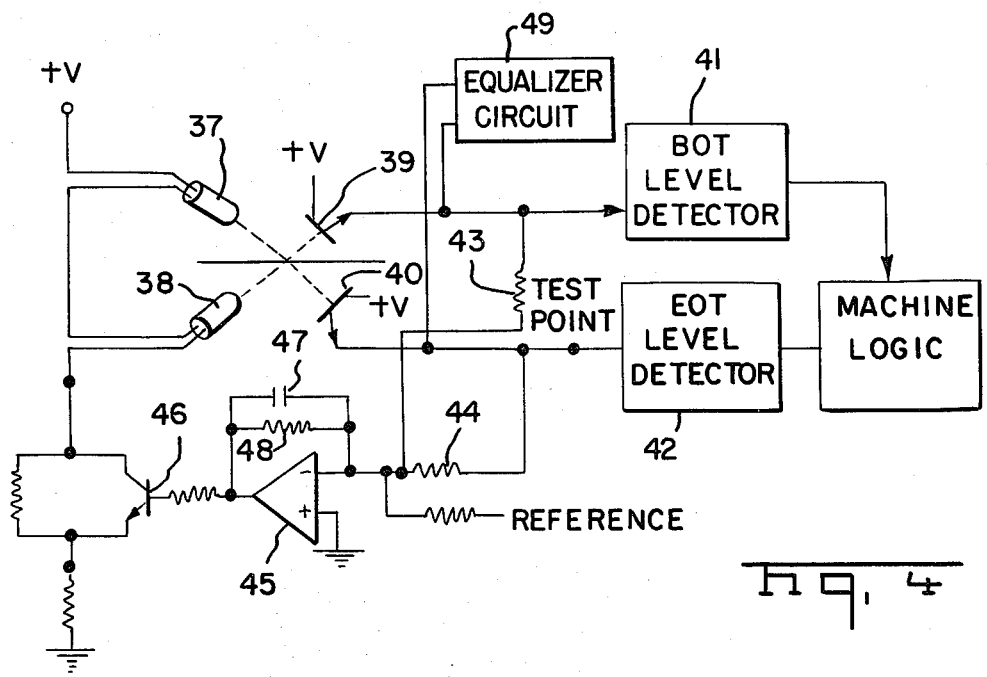

FEEDBACK CONTROL CIRCUIT FOR PHOTOSENSORS IN MAGNETIC TAPE DRIVES

BACKGROUND OF THE INVENTION

This invention relates to magnetic tape recording and reproducing systems and more particularly to a system in which tape marker sensors produce output signals representing the beginning and the end of the tape.

Magnetic tape recording and reproducing units are extensively used with digital data processing systems. Examples of such systems include the STC-3400 and 3600 tape drives manufactured by Storage Technology Corporation, Louisville, Colo.

In such systems, the magnetic tape has reflective markers which mark the beginning of the tape and the end of the tape. Photo-detectors are positioned to detect these markers. When the tape passes the sensor, a signal representing the position of the tape is applied to the tape control system.

In U.S. Pat. No. 3,614,020 Herger, an additional sensor is positioned adjacent the vacuum column on the machine reel side of the magnetic heads. When the end of the tape marker passes this sensor, the machine is switched from a high-speed rewind to a low-speed rewind. This provides a time saving in the rewind operation.

In these systems, it is important to reliably distinguish the change in reflectivity when the reflective marker passes the sensor. Changes in the intensity of the light source with time, thermal drift, and variable tape reflectivity complicate this task. In the prior art systems, a potentiometer is provided to control the voltage level of the photo-detector. Periodically, the service engineer checks the operation of the system and adjusts the potentiometer so that the voltage level is reasonably constant to allow reliable detection. Changes in the reflectivity of the tape present a more serious problem. The reflectivities of the markers are reasonably consistent. However, the reflectivity of the tape varies markedly among the tapes of different manufacturers. Because of this, the service engineer often has to make an adjustment in the potentiometer setting when a tape reel from a different manufacturer is placed on the machine. This is disruptive of good performance of the magnetic tape system.

SUMMARY OF THE INVENTION

In accordance with the present invention a feedback circuit monitors and controls the levels of the light sensor output voltages on magnetic tape drives. The output of the sensor is compared to a reference voltage. The current to the light source is controlled in response to the difference between the reference and the output of the sensor. In this manner, when the ambient detected light level changes, the current to the source is automatically increased or decreased to maintain the sensor voltage level substantially constant. For example, a decrease in detected light level due to aging of the source causes an increase in current to the source.

In accordance with another aspect of this invention, the circuit which is used to detect the low speed rewind area is enabled only during a rewind operation. A signal from the control system is applied to the feedback circuit so that energizing current is supplied to the light source only during rewind, when it is needed. This results in extended life of the source.

The advantages of the present invention include the elimination of manual potentiometer adjustments, extension of the life of the light source, reduction of the thermal drift problem associated with incandescent bulb sources, and a reduction of the sensitivity of the sensor output voltages to variables such as tape reflectivity or aging of the light source.

The foregoing and other objects, features, and advantages of the invention will be better understood from the following more detailed description and appended claims.

SHORT DESCRIPTION OF THE DRAWINGS

FIG. 1 is a schematic view which shows a magnetic tape system to which the present invention is applicable;

FIG. 2 is a block diagram which shows the prior art control of the light detector sensitivity;

FIG. 3 is a block diagram which shows the present invention on the low-speed area detector; and FIG. 4 is a block diagram which shows the present invention on the beginning of tape and end of tape detectors.

DESCRIPTION OF THE PREFERRED EMBODIMENT

The system of FIG. 1 includes a file reel 11 and a machine reel 12. Two vacuum columns 13 and 14 decouple the inertia of the magnetic tape 15 and reels 11 and 12 from the single capstan 16 which drives the tape past the magnetic heads 17.

The magnetic tape includes a beginning of tape (BOT) marker 18 and a similar end of tape (EOT) marker on the other edge of the tape at the end thereof. The BOT and EOT markers are light reflective. A source of light 19 and a photo-detector 20 are positioned in the area of the magnetic heads 17 to detect the end of the tape marker. A source 21 and a photo-detector 22 are similarly positioned to detect the BOT marker. As more fully described in the Herger patent, a light source 23 and a photodetector 24 are positioned adjacent the vacuum column 14 to detect the passage of the BOT marker 18 upon rewind. The photo-detector 24 produces the low speed area (LSA) signal when the marker is detected. This switches the control system 25 to a low-speed rewind. The control system 25 controls the reel drive motor 26 and the capstan drive motor 27.

FIG. 2 depicts the conventional way of maintaining the output of the light sensor substantially constant. The emitter of the photo-transistor 28 is connected to a potentiometer 29. The slider of the potentiometer is connected to the level detector 30. The service engineer periodically adjusts the potentiometer 29 to compensate for changes in the intensity of the light source or changes in reflectivity.

Although FIG. 2 shows the LSA circuit, the conventional BOT and EOT circuits are similar to the LSA circuit, except that the light sources are connected in series.

The present invention is shown in FIG. 3. A feedback circuit is connected between the output of the photo-transistor light sensor 28 and the light source 31 which may be either an incandescent bulb or a light emitting diode. The feedback circuit controls the intensity of the source 31 to maintain the output of the photo-transistor 28 substantially constant notwithstanding changes of reflectivity of the tape or gradual changes of light source efficiency.

An operational amplifier 32 compares the output of the photo-transistor with a reference voltage applied at 33. Transistor 34, connected as an emitter follower, responds to the difference voltage from the operational amplifier 32 to control the current supplied to the light source 31.

In accordance with an important aspect of this invention, the light source 31 is disabled through the feedback circuit, except when there is a rewind operation. In order to do this, a REWIND signal from the control system 25 (FIG. 1) is applied through the resistor 35 and the diode 36 to the feedback circuit. During rewind, the REWIND signal is low thereby enabling the operational amplifier 32. When the system is not in a rewind mode, the REWIND signal goes high. This acts through diode 36 to cut off the operational amplifier 32. As a result, reduced current flows through the transistor 34. This reduced current greatly extends the life of the source 31.

FIG. 4 shows the present invention applied to the BOT and EOT detectors. The light sources 37 and 38 supply light to the BOT sensor 39 and the EOT sensor 40, respectively. The light sources 37 and 38 are connected in series with a common source of voltage.

The outputs of the photo-transistor sensors 39 and 40 are respectively applied to the BOT level detector 41 and the EOT level detector 42. The outputs of the photo-transistors 39 and 40 are connected through resistors 43 and 44 so that the feedback circuit receives a signal representing the average of the output of the two sensors. This average is compared to the reference voltage by the operational amplifier 45. The operational amplifier 45 controls the emitter follower transistor 46 which controls the current supplied to the light sources 37 and 38.

In the event that component tolerances cause a large unbalance between the outputs of the photo-transistors 39 and 40, the equalizer circuit 49 reduces the higher of the two voltage levels, and tends to re-balance the signals. This equalizer circuit monitors the BOT and EOT levels by means of a difference amplifier, and develops a dual-output current sink, proportional in amplitude to the difference between the two levels. This current sink is applied only to the higher of the two photo-transistor outputs, to reduce the voltage level on that side.

It is important that the feedback circuit not react too quickly in a manner which would obliterate the distinction between the tape and the reflective marker. That is, when the reflective marker is detected, a finite difference in the levels of the outputs of transistors 39 and 40 must exist for a period of time sufficient for the level detectors 41 and 42 to operate. If the feedback circuit immediately changes the intensity of the sources in response to a change in output signal, proper operation will not be achieved. It has been found that incandescent bulbs inherently have enough delay in their change in intensity to obviate this problem. However, when light emitting diode detectors are used, it is necessary to provide a delay in the feedback circuit. This is provided for in FIG. 4 by the filter which includes the capacitor 47 and the resistor 48. This can be adjusted to provide the proper delay.

While particular embodiments have been shown and described, various modifications are within the true spirit and scope of the invention. The appended claims are, therefore, intended to cover all such modifications.

What is claimed is:

1. A magnetic tape recording and reproducing system of the type in which a light reflective marker is positioned on the tape of each reel to mark that position of the tape comprising:
    magnetic recording and reproducing heads;
    tape buffering means for decoupling the tape inertia from the reel inertia;
    a tape drive for driving said tape between a file reel and a machine reel, through said tape buffering means and past said magnetic heads;
    a control system including means for controlling said tape in a forward and a rewind direction;
    a source of light incident on said tape between said machine reel and said file reel;
    a light sensor positioned relative to said tape buffering means and heads to detect light reflected from said tape, said sensor producing an electrical output which represents the passage of said reflective marker, the output of said sensor being connected to said control system to switch it from one control operation to another upon passage of said marker; and
    a feedback circuit connected between said sensor output and said source of light for controlling the intensity of said source to maintain said output substantially constant notwithstanding changes of reflectivity of said tape or gradual changes of efficiency of said source of light.

2. The system recited in claim 1 wherein said feedback circuit comprises:
    a source of reference voltage;
    means for comparing said output to said reference voltage to produce a difference voltage; and
    means responsive to said difference voltage for controlling the current to said light source.

3. The system recited in claim 2 wherein said means for comparing includes an operational amplifier, said sensor output and said reference voltage being applied to said operational amplifier to produce an output equal to the difference between them.

4. The system recited in claim 2 wherein said means for controlling includes an emitter follower transistor connected in series with said light source and a source of energizing voltage.

5. The system recited in claim 1 wherein said light source is a light emitting diode and wherein said feedback circuit further comprises:
    a filter circuit imposing a delay in the response between said output and the control of said light source.

6. The system recited in claim 5 wherein said control system produces a rewind signal when said tape is being driven in the rewind direction, sad rewind signal being applied to enable said feedback circuit so that current is supplied to said source only during a rewind operation.

7. The system recited in claim 5 further comprising:
    second and third light sources and second and third sensors positioned adjacent said magnetic heads, the outputs of said second sensor and third sensors being connected to said control system to produce beginning of tape and end of tape signals.

8. The system recited in claim 6 wherein said second and third sources are connected in series with a common energizing voltage; and
    a common feedback circuit connected from the output of both of said sensors to both of said sources.

9. The system recited in claim 7 further comprising:

an equalizer circuit connected to the outputs of said second and third sensors to substantially balance said outputs.

10. The system recited in claim 8 further comprising:
a filter circuit imposing a delay in the response between said output and the control of said light source.

11. A magnetic tape recording and reproducing system of the type in which a light reflective beginning of tape marker is positioned on the tape of each reel comprising:
  magnetic recording and reproducing heads;
  two vacuum columns, one on each side of said magnetic heads;
  a tape drive for driving said tape between a file reel and a machine reel past said magnetic heads;
  a control system including means for controlling said tape in a forward and a rewind direction;
  a source of light incident on said tape between said machine reel and said file reel;
  a light sensor positioned at the opening of the vacuum column on the machine reel side of said magnetic heads to detect light reflected from said tape, said sensor producing an electrical output which represents the passage of said reflective marker, the output of said sensor being connected to said control system to switch it from high speed rewind to a low speed rewind upon passage of said marker; and
  a feedback circuit connected between said sensor output and said source of light for controlling the intensity of said source to maintain said output substantially constant notwithstanding changes of reflectivity of said tape or gradual changes of efficiency of said source of light.

* * * * *